Figure 1:
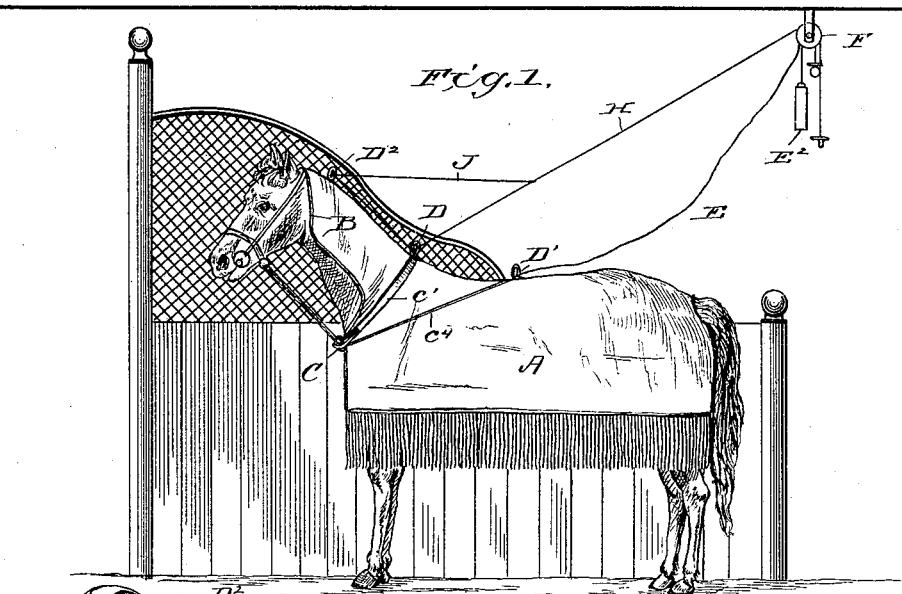

(No Model.) 2 Sheets—Sheet 1.

G. C. HALE.
AUTOMATIC HORSE COVER.

No. 377,381. Patented Feb. 7, 1888.

Witnesses
Jos. A. Ryan
W. Bernhard

Inventor
George C. Hale
By his Attorneys
Edson Bros.

(No Model.) 2 Sheets—Sheet 2.

G. C. HALE.
AUTOMATIC HORSE COVER.

No. 377,381. Patented Feb. 7, 1888.

Witnesses

Inventor
George C. Hale
By his Attorneys
Edson Bros.

UNITED STATES PATENT OFFICE.

GEORGE C. HALE, OF KANSAS CITY, MISSOURI.

AUTOMATIC HORSE-COVER.

SPECIFICATION forming part of Letters Patent No. 377,381, dated February 7, 1888.

Application filed July 30, 1887. Serial No. 245,720. (No model.)

*To all whom it may concern:*

Be it known that I, GEORGE C. HALE, a citizen of the United States, residing at Kansas City, in the county of Jackson and State of Missouri, have invented certain new and useful Improvements in Automatic Horse-Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to automatic horse-blankets; and it consists of the peculiar construction and combination of devices, as will be hereinafter fully described, and particularly pointed out in the claims.

The primary object of my invention, which is especially adapted for use in fire-engine houses, is to provide a horse-blanket or fly-net which will be automatically disengaged from the animal when the latter moves forward through the door of the stall to take position at the engine or other apparatus, to be harnessed thereto in responding to an alarm of fire.

A further object of my invention is to provide the blanket or fly-net with automatic fastening devices for securely holding the cover in proper position on the animal, which devices are easily and quickly disengaged to release the cover from the animal when an alarm of fire is sounded.

A further object of my invention is to provide the blanket or fly-net with elevating and suspending devices which are so constructed as to relieve the animal of the constant weight or tension of the elevating weight or spring and permit him to have all possible freedom of movement in the stall, and which means is automatically operated to carry the cover away from the animal when the latter leaves the stall.

The advantages attained by the use of my invention are, a blanket or fly-net can be constantly used on the animal while he is standing in the stall, while the necessary freedom of movement is permitted without danger of the blanket becoming displaced, and the blanket is automatically and quickly drawn off the animal when he moves forward through the door of the stall to take position at the engine or other like apparatus, to be harnessed thereto, the blanket remaining at or near the position occupied by the horse when standing in the stall, and is therefore out of the way in harnessing the horse to the apparatus.

Figure 2:
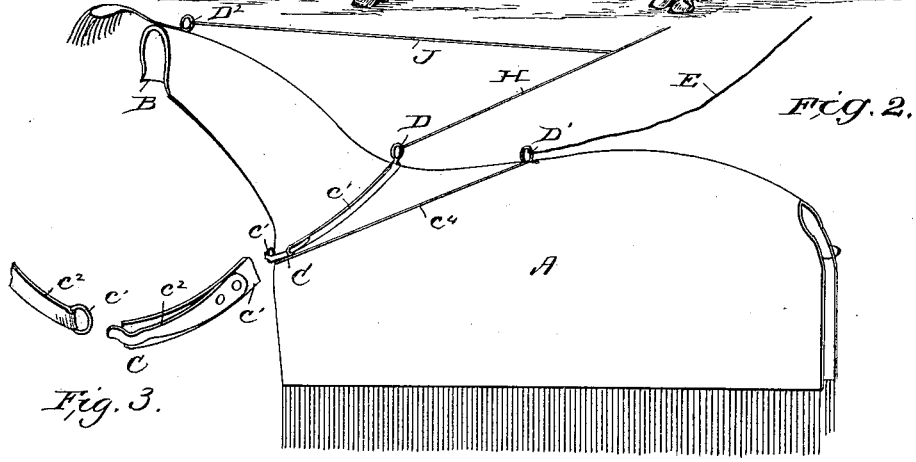
Figure 3:
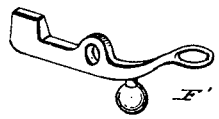
Figure 4:
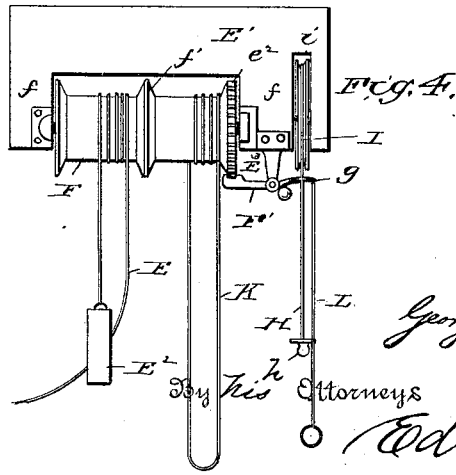
Figure 5:
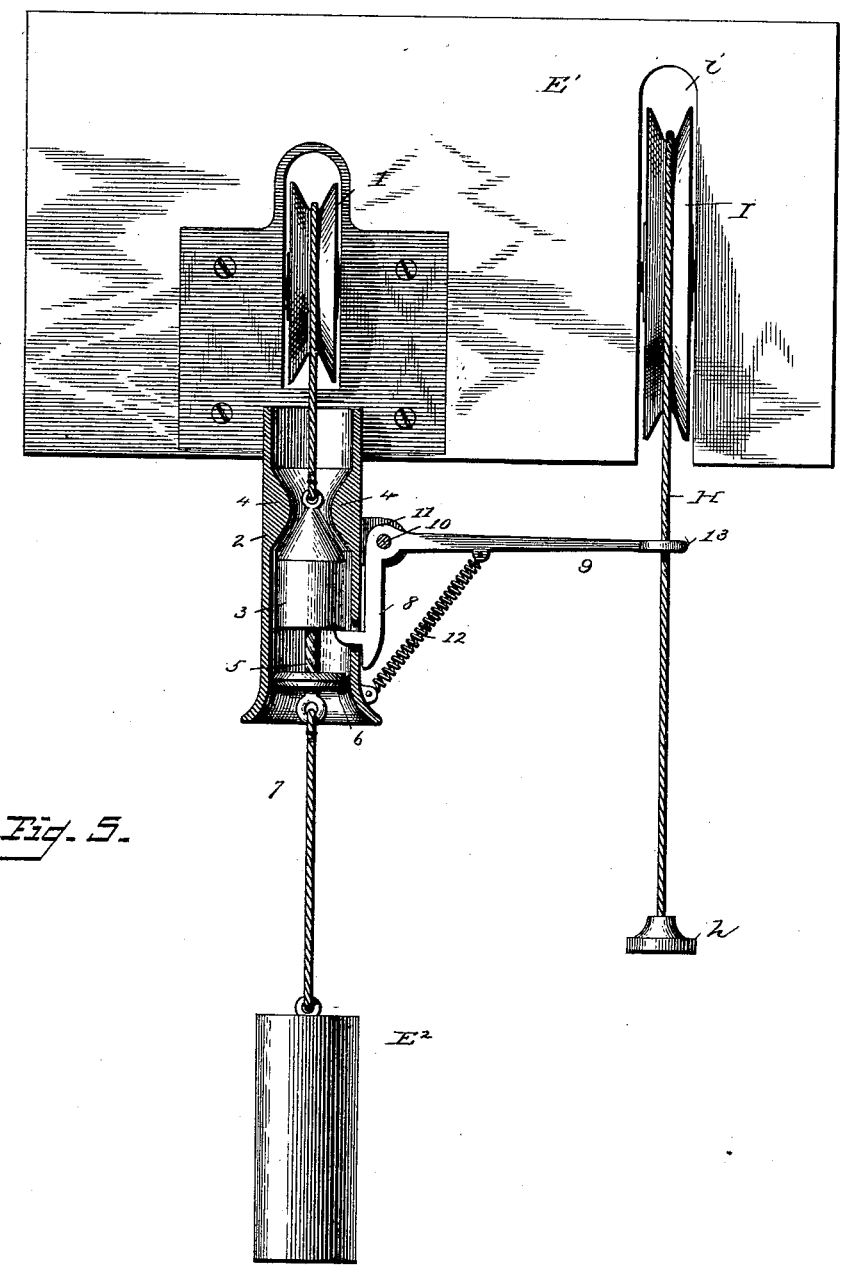

In the accompanying drawings, Figure 1 is a view showing my invention adapted for use. Fig. 2 is a view of a blanket to show the fastening devices for holding the same in place. Fig. 3 is a detail view of one of the fastening devices detached from the blanket. Fig. 4 is an enlarged view in side elevation of the elevating device. Fig. 5 is an enlarged view in rear elevation, partly in section, of another form of elevating and tripping devices.

Referring to the drawings, in which like letters of reference denote corresponding parts in all the figures, A designates a blanket, fly-net, or other kind of covering for a horse, which may be of the ordinary or any preferred pattern. To the extreme front end of the blanket or fly-net which covers the neck of the animal I secure a spring-clasp, B, which is preferably of the shape of an inverted U, the ends of which are curved outwardly to permit the clasp to be readily fitted over the animal's neck. The arms of the clasp are secured to the sides of the reduced neck portion of the cover, so as to hold the latter spread apart and insure the easy adjustment over the animal's neck.

To the approximate edges of the blanket or fly-net, at the portion thereof that covers the shoulders of the animal, is secured another fastening device, C, which is preferably of different construction from the clasp B. The fastening C is made in two parts, one of which, C', is in the form of a ring or eye and is secured to one of the edges of the blanket, and the other, C², is formed of a spring-hook, which is secured to a strap, c', that is united or secured to the blanket. The ring or eye section c' of the fastening C is likewise secured to a strap, c², and these straps c' c² extend around the blanket and meet at the middle thereof, as shown, and other straps, c⁴, extend from the fastening device C to the middle of the blanket. Terrets or rings D D' are secured to the middle of the blanket at the points where the straps c', c², and c⁴ meet, and another terret or ring, $D^2$, is secured to the front end of the blanket immediately over or in close proximity to the front clasp, B, the function of which terrets or rings will presently appear.

E designates an elevating-cord which is secured to one of the terrets or rings of the blanket, preferably the rear one, D′, and this cord passes over a drum or pulley, F, which is suitably supported above the stall so as to rotate freely, the free end of the cord being connected to a weight, $E^2$, which serves to exert a constant tension on the blanket and to carry the latter away from the horse when the fastening devices thereof are released by the animal moving forward in the stall through the front door thereof to take position at the engine or other apparatus.

I do not desire to confine myself to the use of weighted cord herein shown and described for rotating the drum in one direction, as a spring can be substituted for the cord and weight, nor to the use of the particular kind of clasp and fastening device for holding the blanket on the animal.

In order to relieve the blanket of the constant tension or weight exerted thereon by the spring or weight of the rotary drum F, I employ a tripping device, F′, which is automatically operated when the animal moves forward through the front door of the stall, so as to release the drum, which is rotated by the spring or gravity of the weight $E^2$.

The rotary drum or pulley F is arranged in a horizontal position above and in close proximity to the stall to be occupied by the animal, and the shaft or trunnions of the drum are journaled in suitable bearings which are fixed in depending arms $f$ of a bracket, E′, which is permanently secured to the ceiling of the engine-house, or other suitable fixture, at a suitable point over the stall occupied by the animal. The rotary drum is provided at or near its middle with an annular circumferential flange or ledge, $f'$, and at one end with a ratchet, $e^2$, with the latter of which engages a tripping device, F′, which is made in the form of a pawl, to normally prevent the drum from rotating in one direction and unwind the elevating cord or rope E, which is preferably wound around the drum a number of times.

The tripping-pawl F′ is weighted, so as to be normally engaged with the ratchet on the rotary drum, or a spring may be used for this purpose, as is obvious, and said pawl is pivoted at an intermediate point of its length to a hanger or arm, $E^3$, which is fixed to the bracket E′. The opposite end of the tripping-pawl is provided with a guide eye or loop, $g$, through which passes a tripping cord or rope, H, one end of which is provided with a button, $h$, which is adapted to come in contact with the guide eye or loop of the pawl when the cord is raised or elevated, to thereby release the pawl from the ratchet and allow the drum to be rotated by the action of the spring or descent of the weight $E^2$, attached to the elevating-cord E.

The tripping-cord or rope H passes over a grooved pulley, I, which is arranged in a vertical slot or opening, $i$, formed in the bracket or support E′ at one side of the hanger $E^3$, and the pulley is suitably journaled in fixed bearings in the bracket. The free end of the tripping cord or rope H is secured to a central terret or ring, D, of the blanket A, and another cord, J, is secured at one end to the tripping-cord H at an intermediate point of the length of the latter, the other end of the cord J being secured to the front terret of the blanket. That portion of the elevating-cord E between the rear terret, D′, and the rotary drum remains slack, as shown, in order to relieve the blanket of the constant tension or pull of the weight $E^2$, and to permit the animal to have considerable freedom of movement while standing in the stall.

An adjusting-rope, K, which is made of a single continuous piece, is wound a number of times around the drum F, and it is arranged at one side of the circumferential flange or rim of the drum to the elevating cord E, which is arranged at the opposite side of the flange, the adjusting-rope depending from the drum a suitable distance within convenient reach of the operator.

A push-rod, L, is connected to one end of the tripping-pawl for the purpose of releasing the latter from the drum when it is desired to rotate the same by means of the adjusting-rope to lower the blanket or fly-net.

The operation of my invention is as follows: To apply or connect the blanket to the animal, the push-rod L is pushed up to release the tripping-pawl from the ratchet, and the drum is rotated by hand by the adjusting-cord K until the blanket has been lowered a sufficient distance to be readily grasped, when the push-rod L is released. The blanket is now spread over and fastened on the animal by pressing the clasp B around the neck and locking the sections of the fastening C together. The drum is now rotated by the rope K in the reverse direction to that in which it is first turned, in order to allow that portion of the elevating-rope E between the blanket and the drum to become slack or loose and wind up the weighted end of the cord E, and the detent or button on the tripping-cord H hangs free to take up the slack in the cords H J. The button on one end of the tripping-cord hangs a considerable distance below the guide-loop of the tripping-pawl, so that the trip-cord can be drawn up some distance, so as to allow considerable movement of the trip-cord before the button throws the trip-pawl from engagement with the drum, and in view of the play permitted to the trip-cord and the slack in the elevating-cord E the animal is allowed the necessary freedom of movement in the stall without undue strain or pull being exerted on the blanket by the elevating device to displace the blanket or fly-net. The stalls of all engine-houses are provided with swinging doors which open outwardly from the front ends thereof, and as these doors are normally closed the animal, while standing in the stall, is prevented by the door from moving forward such a distance as to throw the tripping device and release the elevating device. When an alarm of fire is sounded, the front door of the stall is thrown open and the animal moves forward in the stall through the door thereof to pull the tripping-cord H forward until the button thereof strikes the tripping-pawl, which is thus thrown out of engagement with the drum and permits the latter to be rotated under the gravity of the weight E' or the spring. The forward movement of the animal, combined with the tension or pull exerted by the weight upon the blanket, causes the fastening devices to become disengaged and release the blanket, so that as the animal passes through the door of the stall the blanket is drawn off the horse and elevated out of the way. It will thus be seen that the cover is automatically released from the animal when an alarm of fire is sounded without the aid or attention of the attendant, and that it is immediately carried up out of the way, so as to permit the animal to leave the stall without hinderance.

The operation of removing the blanket is accomplished with great ease and very quickly within the time required for the animal to leave the stall.

I am aware that the tripping device can be dispensed with and the weighted cord allowed to exert a constant tension on the blanket, which is held in place in this instance by the fastening devices, or that a cord can be permanently connected to the ceiling or other fixture and to the blanket, the fastening devices being automatically released by the pressure thereon of the animal when he moves forward through the open door of the stall; and I am also aware that by the use of the tripping device normally in engagement with the elevating device to relieve the blanket of the constant tension or pull of the weight or spring of such device the fastenings on the blanket can be dispensed with.

It being broadly new to provide a blanket or fly-net with a device for drawing the same off the horse when he starts forward to leave the stall through the door thereof, I do not desire to confine myself to the form of suspending device herein shown and described as an embodiment of my invention, as I am aware that other suspending devices can be substituted therefor without departing from the spirit or sacrificing the advantages of my invention. I prefer to employ the elevating and tripping device shown in Fig. 5 of the drawings, in which I employ a narrow grooved pulley, 1, over which the elevating-cord is passed but once, in lieu of the long drum around which the elevating-cord is wound a number of times. This pulley is arranged in a vertical slot in the hanger, and from the latter depends a tubular guide, 2, which is arranged immediately beneath and in line with the pulley. The elevating-cord passes from the pulley into the guide and has a conical detent, 3, secured thereto, said detent operating in the guide and impinging at its cone-shaped end against inclined stop-shoulders 4, which are formed on the interior of the guide to limit the upward movement of the detent. From the detent depends a rope or rod, 5, to which is secured a button, 6, and the weight-rope 7 is secured to the rope or rod 5 at a point below the button 6. The detent is normally housed in the tubular guide and held up to prevent the tension of the weight on the elevating-cord from being exerted on the blanket or fly-net at all times by a tripping-pawl, 8, which works through a slot in the guide and takes beneath the conical detent, as shown very clearly in Fig. 5. This tripping-pawl has a right-angled arm, 9, and the pawl is pivoted at a point where the arm joins the same, as at 10, to a fixed lug, 11, on the tubular guide, said pawl being normally held beneath the conical detent, or in the path of the latter, by means of a coiled retracting-spring, 12, which has its ends connected to the arm of the tripping-pawl and the tubular guide. The extended arm of the tripping-pawl has an eye, 13, at its free end, through which passes the trip-cord having the button h.

The operation of this part of my invention is obvious. When the trip-cord is elevated, the button thereon strikes the arm of the tripping-pawl and withdraws the latter, against the tension of the retracting spring, from beneath the conical detent, which allows the weight to drop and strain the elevating-cord to pull the blanket or fly-net from the animal. In readjusting the blanket or fly-net to the animal it is drawn forward over the animal, and the weighted end of the elevating-cord drawn up to cause the conical detent to enter the tube and pass the tripping-pawl, which is pressed beneath the detent by the action of the spring.

Having thus fully described my invention, what I claim as new, and desire to secure by Letters Patent, is—

1. The combination, with a blanket and a pulley, of a weighted elevating-cord attached at one end to the blanket and passing over the pulley near the other end, and a trip-and-cord mechanism, substantially as described, to release the weight and retract the blanket, as set forth.

2. The combination, with a blanket and a pulley, of a weighted elevating-cord attached at one end to the blanket, and passing over the pulley near its other end, means to hold the blanket detachably on the horse, and a trip-and-cord mechanism, substantially as described, to release the weight and retract the blanket, as set forth.

3. The combination, with a blanket and a pulley, of a weighted elevating-cord attached at one end to the blanket and passing over the pulley, a trip-and-cord mechanism, substantially as described, to release the weight, and spring fastening devices connected to the blanket to detachably hold the same on the horse, and adapted to be automatically released by a pull of the elevating-cord, as set forth.

4. The combination, with a blanket and a pulley, of a weighted elevating-cord connected at one end to the blanket and passing over the pulley, a trip mechanism for normally suspending the weight, and a trip-cord connected at one end with the blanket and at its other end with the trip mechanism in such manner that said trip-cord can move a limited distance without throwing the tripping mechanism and releasing the weight, as and for the purpose described.

5. The combination, with a blanket and a pulley, of an elevating-cord attached at one end to the blanket and passing over the pulley, a trip-and-cord mechanism, and means, substantially as described, for exerting tension on the elevating-cord when the trip is thrown, as and for the purpose described.

6. The combination of a blanket, a weighted elevating-cord connected thereto, a pulley over which the cord passes, a trip-pawl having a guide, and a trip-cord connected with the blanket and passing through the guide of the trip-pawl, and having a button which is adapted to strike and release the trip-pawl, substantially as described, for the purpose set forth.

7. The herein-described combination of an animal blanket or cover, means secured to the blanket or cover for holding the same on an animal, said means adapted to be automatically released to permit the blanket or cover to be removed when the animal leaves a stall, a cord or rope secured at one end to the blanket or cover and passing over a guide or supporting bracket at its other end, and a button or other obstruction made with or attached to the cord, as and for the purpose described.

8. The combination of a blanket, a guide drum or pulley, a cord connected to the blanket and having a detent, 3, a trip-pawl engaging the detent to prevent the cord from exerting tension on the blanket, and a trip-cord for throwing the pawl, substantially as described.

9. The combination of a blanket, a hanger having a depending tubular guide, a guide drum or pulley journaled in the hanger, a weighted elevating-cord passing through the guide and having a detent, 3, a trip-pawl adapted to engage the detent, and a trip-rope, substantially as described.

10. The combination of a blanket, a fixed hanger, a guide-pulley journaled therein, a vertical tubular guide fixed to the hanger in line with the pulley and having the projections on its inner side, a weighted elevating-cord passing over the pulley and through the guide, a conical detent secured to the cord, and a pivoted spring-controlled trip-pawl having a trip-cord connected thereto, substantially as described.

In testimony whereof I affix my signature in presence of two witnesses.

GEORGE C. HALE.

Witnesses:
JOHN P. THOMPSON,
CHAS. W. CLARKE.